(12) United States Patent
Irie et al.

(10) Patent No.: US 7,345,124 B2
(45) Date of Patent: Mar. 18, 2008

(54) PROCESS FOR PREPARING FLUORINE-CONTAINING POLYMER

(75) Inventors: Masaki Irie, Settsu (JP); Satoshi Tokuno, Settsu (JP); Sadashige Irie, Settsu (JP); Yosuke Nishimura, Settsu (JP); Yoshinori Hori, Settsu (JP); Mitsuru Kishine, Settsu (JP)

(73) Assignee: Daikin Industries, Ltd., Tokyo (JP)

( * ) Notice: Subject to any disclaimer, the term of this patent is extended or adjusted under 35 U.S.C. 154(b) by 380 days.

(21) Appl. No.: 10/521,807

(22) PCT Filed: Jul. 23, 2003

(86) PCT No.: PCT/JP03/09315

§ 371 (c)(1),
(2), (4) Date: Jan. 21, 2005

(87) PCT Pub. No.: WO2004/009647

PCT Pub. Date: Jan. 29, 2004

(65) Prior Publication Data

US 2005/0250922 A1    Nov. 10, 2005

(30) Foreign Application Priority Data

Jul. 24, 2002    (JP) .............................. 2002-215532
Feb. 28, 2003    (JP) ............................... 2003-53284

(51) Int. Cl.
*C08F 14/18*    (2006.01)
(52) U.S. Cl. .................. 526/250; 525/326.2; 526/253; 526/255

(58) Field of Classification Search ................ 526/250, 526/253, 255; 525/326.2
See application file for complete search history.

(56) References Cited

U.S. PATENT DOCUMENTS

| 5,175,223 | A | * | 12/1992 | Brinati et al. ................ 526/254 |
| 5,789,489 | A | * | 8/1998 | Coughlin et al. ........... 525/370 |
| 5,994,487 | A | * | 11/1999 | Enokida et al. ............. 526/247 |
| 6,388,033 | B2 | * | 5/2002 | Noda et al. ................. 526/206 |
| 6,806,332 | B2 | * | 10/2004 | Royer et al. ................ 526/242 |
| 6,914,105 | B1 | * | 7/2005 | Charpentier et al. ......... 526/67 |

FOREIGN PATENT DOCUMENTS

| EP | 445839 A1 | * | 9/1991 |
| JP | 62-112611 A | | 5/1987 |
| JP | 1-319512 A | | 12/1989 |
| JP | 2001-316406 A | | 11/2001 |
| WO | WO-2004/009647 | * | 1/2004 |

* cited by examiner

*Primary Examiner*—Peter D. Mulcahy
*Assistant Examiner*—Henry S. Hu
(74) *Attorney, Agent, or Firm*—Sughrue Mion, PLLC

(57) ABSTRACT

The present invention provides a process for preparing a fluorine-containing polymer having few branched chains and little weight change in high temperatures, which is a new process wherein composition distribution substantially does not occur. The fluorine-containing polymer is prepared by a batch copolymerization process conducted under conditions of reduced temperature of at least 0.95 and reduced pressure of at least 0.80 of the critical constant calculated from critical temperature, critical pressure and composition ratio of each monomer in the gaseous phase of the reaction vessel using the Peng-Robinson formula.

8 Claims, No Drawings

PROCESS FOR PREPARING FLUORINE-CONTAINING POLYMER

TECHNICAL FIELD

The present invention relates to a process for preparing a fluorine-containing polymer, in which composition distribution, which was a problem in polymerization methods of fluorine-containing polymers under high pressure, essentially does not occur. Also, the present invention relates to a composition comprising the polymer obtained by this process, which gives a vulcanized fluororubber that can be vulcanized efficiently and has small compression set and excellent mechanical properties. Furthermore, the present invention relates to a new fluorine-containing polymer having uniform composition distribution and extremely low Mooney viscosity and a preparation process thereof. The present invention also relates to use of this low viscosity polymer as a processing aid and a process for preparing vulcanized fluororubber.

BACKGROUND ART

Vinylidene fluoride (VdF) elastomers of various compositions have been suggested. As such VdF elastomers, known are a binary copolymer of VdF and hexafluoropropylene (HFP) (VdF/HFP=60 to 15/40 to 85 (% by weight)) (for example, see JP-B-33-7394); a ternary copolymer comprising tetrafluoroethylene (TFE), VdF and HFP in which TFE is 3 to 35% by weight and the weight ratio of VdF/HFP is 2.33/1 to 0.667/1 (for example, see JP-B-36-3495); a ternary copolymer comprising tetrafluoroethylene (TFE), VdF and HFP in which TFE is 10 to 30% by weight and the weight ratio of VdF/HFP is 1.6/1.0 to 4.0/1.0 (for example, see JP-B-48-18957); and a terpolymer comprising 57 to 61% by weight of VdF, 27 to 31% by weight of HFP and 10 to 14% by weight of TFE (for example, see JP-A-53-149291). Also, as a method for preparing a VdF copolymer, suggested is the method of preparing a VdF elastomer comprising VdF and at least one other fluorinated ethylenic unsaturated monomer containing at least the same number of fluorine atoms as carbon atoms, in the presence of a chain transfer agent (for example, see JP-A-47-5944).

Mold processing of a fluorine-containing elastomer is conducted using common rubber processing machines. That is, mold processing is usually conducted in the order of kneading by a kneading roll or kneader, molding by an extruder, calender roll or press machine, primary vulcanization by press injection and finally, secondary vulcanization by an oven.

However, when only the above fluorine-containing elastomer is used, there were problems regarding mold processing such as roll processability in kneading and mold releasing properties in compression molding are poor, staining of the metal die cannot sufficiently be prevented and flowability in injection molding is poor. In order to solve these problems regarding mold processing, widening the molecular weight distribution was suggested (for example, see JP-A-52-62391 and JP-A-4-209643).

However, by increasing low molecular weight components, compression set resistance decreases and mechanical strength such as tensile strength and elongation and also, solvent resistance tend to become poor. Furthermore, with respect to the objective of obtaining an elastomer having low viscosity to a conventionally unknown degree, it could easily be conceived that the vulcanization properties would decrease further, as low molecular weight components increase.

In this way, properties such as compression set resistance and mechanical properties and mold processability are considered to be opposing properties. In fact, in order to obtain balance of properties and mold processability, the molecular weight and molecular weight distribution of the polymer are adjusted or the structure of the polymer terminals are changed depending on the use or either of the properties are sacrificed.

Furthermore, in a fluorine-containing elastomer composition for sealing material such as O-rings and gaskets, particularly low compression set is required and also, efficient vulcanizability (high vulcanization rate and high crosslinking density) are required. Compression set is an important factor in evaluating sealing performance and when compression set is high, sealing ability is lost in a short period of time. Vulcanizability is a factor that largely influences productivity in mold processing and vulcanizability is preferably as high as possible within the range that required properties are satisfied. Also, in injection molding, excellent flowability is required and when flowability is poor, injecting into the die becomes difficult and more material than necessary must be used. Also, the thickness of the molded article may become uneven.

In order to obtain efficiency in vulcanizability, suggested is the method of decreasing ionic terminals (or acid terminals) derived from ammonium persulfate, which is conventionally used as a polymerization initiator, as much as possible. Examples are the method of using an oil-soluble organic peroxide as the polymerization initiator (for example, see JP-A-6-302487 and JP-A-8-301940) and the method of combining fluoroalkylsulfinate and an organic peroxide (for example, see U.S. Pat. No. 5,256,745). However, these methods are not satisfactory with respect to processability other than vulcanizability.

As a method for simultaneously improving vulcanization efficiency and compression set resistance, the method of adding a phosphonium compound as the vulcanization accelerator is suggested (for example, see JP-A-62-54750). However, even with this method, the problem that processability cannot be improved still remains.

Furthermore, as described above, improvement in flowability has been attempted by lowering the molecular weight, but this is insufficient with respect to compression set resistance and vulcanization efficiency.

In order solve the above problems, a fluorine-containing elastomer, in which the polymer has few branched chains and the weight change in high temperatures is small, and a preparation process thereof have been disclosed (for example, see WO 01/34666). According to this method, a fluorine-containing elastomer that is excellent in vulcanization efficiency, mold processability and compression set of a molded article is obtained, but on the other hand, because the polymer obtained by the disclosed polymerization method has composition distribution, there is the problem that the polymer contains components that differ from the target composition. Furthermore, in order to keep the composition distribution within a specific width, more space than necessary must be acquired and there are problems regarding quality stability and productivity. The reason that composition distribution occurs is because monomers are present in the space in a high concentration and when polymerization is conducted at high pressure, the monomers in the space that is decreased by progression of polymerization are introduced into the produced polymer.

In the conventional art, a polymer of the target composition as the average value is obtained, by decreasing the HFP concentration of the initial monomer in advance, in order to deal with the phenomenon that the HFP concentration in the polymer increases along with progression of polymerization. However, according to this method, because the gaseous phase composition changes largely before and after polymerization, not only does composition distribution of the polymer occur, but also, there is the problem that a polymer of disadvantageous components tends to be produced by post-polymerization after the reaction. Also, because the initial monomers also serve as a buffer for composition distribution in polymerization, a constant amount of the gaseous phase must be acquired and as a result, the amount of monomer blow per batch is large. Thus, productivity is problematic.

On the other hand, the idea behind preparing an elastomer having extremely low viscosity is not disclosed and particularly, as there is no description that a sharp molecular weight distribution Mw/Mn is important, a process for preparing a low viscosity polymer was unknown in reality.

The object of the present invention is to provide a process for preparing a fluorine-containing polymer having few branched chains and little weight change in high temperatures (little thermal decomposition and evaporation), which is a new process wherein composition distribution essentially does not occur.

Another object of the present invention is to provide a fluorine-containing polymer, which has high vulcanization efficiency and excellent mold processability although the viscosity is low to a conventionally unknown degree and gives a vulcanized fluororubber having low compression set, and a composition comprising the same by the above process. Also, the present invention provides a process for preparing vulcanized fluororubber by conducting primary vulcanization of the above composition, while conducting defoaming treatment under reduced pressure.

In addition, the present invention relates to use of the low viscosity polymer as a processing aid.

DISCLOSURE OF INVENTION

That is, the present invention relates to a process for preparing a fluorine-containing polymer, which is a batch copolymerization process conducted under conditions of reduced temperature ($T_R$) of at least 0.95 and reduced pressure ($P_R$) of at least 0.80 of a critical constant calculated from critical temperature, critical pressure and composition ratio of each monomer in the gaseous phase of the reaction vessel using the Peng-Robinson formula; wherein when the number of monomer components in the target polymer is represented as n (n is an integer of 2 or larger), the name of each monomer component is represented as $A_1, A_2, \ldots A_n$, the weight percentage of each monomer component $A_1, A_2, \ldots A_n$ of the target polymer composition is represented as $a_1, a_2, \ldots a_n$ (%) (a satisfies $$a \text{ satisfies } \sum_n a_n = 100 \Big),$$

the weight percentage of each monomer component of the initial monomer composition is represented as $a'_1, a'_2, \ldots a'_n$ (%) (a' satisfies $$\sum_n a'_n = 100$$

and $a'_1, a'_2, \ldots a'_n$ is determined in a constant manner depending on predetermined polymerization conditions) and specific gravity of the gaseous phase monomers when polymerizing/specific gravity of the target polymer is represented as B, the composition weight ratio of additional monomers is calculated for each monomer from the formula $$(a_1-a'_1 \times B):(a_2-a'_2 \times B) \ldots (a_n-a'_n \times B)$$

in the order of components $A_1, A_2, \ldots A_n$, and additional monomers containing additional monomers in the composition weight ratio of additional monomers are added.

The polymerization pressure can be at least 4 MPa depending on the type and composition ratio of the monomers to be copolymerized. This pressure is suitably used when the target fluorine-containing polymer is a copolymer comprising vinylidene fluoride and hexafluoropropylene; wherein the mol ratio of vinylidene fluoride:hexafluoropropylene is 9:1 to 5:5. Also, the polymerization pressure can be at least 3 MPa. This pressure is suitably used when the target fluorine-containing polymer is a copolymer comprising vinylidene fluoride, hexafluoropropylene and tetrafluoroethylene; wherein the mol ratio of vinylidene fluoride:hexafluoropropylene is 9:1 to 5:5 and the content of tetrafluoroethylene is at most 40% by mol.

The present invention also relates to a fluorine-containing polymer composition comprising the fluorine-containing polymer, a curing agent and a vulcanization accelerator.

The fluorine-containing polymer composition preferably has Mooney viscosity of at most 15 at 121° C., essentially does not contain iodine and has compression set after vulcanization of at most 25%.

In the fluorine-containing polymer composition, the weight average molecular weight/number average molecular weight measured by GPC is preferably at most 3.0.

The present invention also relates to a fluorine-containing polymer, which is a copolymer comprising vinylidene fluoride and hexafluoropropylene; wherein the mol ratio of vinylidene fluoride:hexafluoropropylene is 9:1 to 5:5, the content of tetrafluoroethylene is 0 to 40% by mol, the weight average molecular weight is at most 140,000, weight average molecular weight/number average molecular weight is at most 3.0, iodine is essentially not contained and the compression set after vulcanization is at most 30%.

The present invention also relates to a fluorine-containing polymer composition comprising the fluorine-containing polymer, a curing agent and a vulcanization accelerator.

The present invention also relates to a processing aid comprising the fluorine-containing polymer composition obtained by the above process, which has Mooney viscosity of at most 15 at 121° C. and essentially does not contain iodine.

The present invention also relates to a fluorine-containing polymer composition comprising the above processing aid and a fluorine-containing polymer having Mooney viscosity of at least 15 at 121° C.

The present invention also relates to process for preparing vulcanized fluororubber, which comprises conducting primary vulcanization of the fluorine-containing polymer composition comprising the fluorine-containing polymer, vulcanization agent and vulcanization accelerator, while conducting defoaming treatment under reduced pressure.

BEST MODE FOR CARRYING OUT THE INVENTION

The reaction vessel used in the present invention is a pressure-resistance vessel, as polymerization is conducted under applied pressure. To the reaction vessel is added an aqueous medium (usually deionized water) for emulsion polymerization containing polymer particles of the same composition as the target polymer and this is the aqueous phase. The reaction vessel is composed of this aqueous phase and a gaseous phase and after the gaseous phase is replaced with nitrogen or the like, the polymerizable monomers are introduced. Subsequently, the contents of the reaction vessel, particularly the aqueous phase, are stirred and the polymerizable monomers are supplied from the gaseous phase to the aqueous phase. The monomers supplied to the aqueous phase permeate into the polymer particles and raise the concentration of polymerizable monomers in the polymer particles. By continuing to supply monomers into the gaseous phase, the monomer concentration in the polymer particles reach saturation (rate of monomer supply into the aqueous phase reach equilibrium) and then a polymerization initiator is added to start polymerization.

As polymerization is continued, the monomers are consumed and the monomer concentration in the produced polymer particles decrease. Therefore, monomers (additional monomers) must constantly continued to be supplied into the polymer. A characteristic of the preparation process of the present invention is that the additional monomers are added in a specific composition.

That is, the composition weight ratio of the additional monomers is determined by the following calculations and then the additional monomers are supplied.
(1) The number of monomer components in the target polymer is represented as n (n is an integer of 2 or larger)
(2) The name of each monomer component is represented as $A_1, A_2, \ldots A_n$ (the number corresponds with the number of the weight percentage of each monomer component described below)
(3) The weight percentage of each monomer component of the target polymer composition is represented as $a_1, a_2, \ldots a_n$ (%) (a satisfies $$\sum_n a_n = 100$$

)

(4) the weight percentage of each monomer component of the initial monomer composition is represented as $a'_1, a'_2, \ldots a'_n$ (%) (a satisfies $$\sum_n a'_n = 100$$

and $a'_1, a'_2, \ldots a'_n$ is determined in a constant manner depending on predetermined polymerization conditions)
(5) The specific gravity of the gaseous phase monomer when polymerizing/specific gravity of the target polymer=B
(6) The composition weight ratio of additional monomers is $(a_1-a'_1 \times B): (a_2-a'_2 \times B) \ldots (a_n-a'_n \times B)$ in the order of components $A_1, A_2, \ldots A_n$ Below is an example of the case in which there are two monomer components.
(1) The number of monomer components is n=2
(2) The name of the each monomer component is $A_1, A_2$
(3) The weight percentage of each monomer component of the target polymer composition is $a_1, a_2$ (%)
(4) The weight percentage of each monomer component of the initial monomer composition is $a'_1, a'_2$ (%)
(5) The specific gravity of the gaseous phase monomers when polymerizing/specific gravity of the target polymer=B
(6) The composition weight ratio of additional monomers is $A_1:A_2=(a_1-a'_1 \times B):(a_a-a'_a \times B)$ In the composition of additional monomers according to this addition method, error is acceptable to the extent that the properties of the target polymer are not lost. Specifically, error within ±5% of the calculated mol % is preferable and error within ±1% is more preferable.

As a specific example 1, described is the calculation method of the composition of additional monomers when the target polymer is $$VdF:HFP = 60:40 \text{ (weight ratio percentage)}$$
$$= 78:22 \text{ (mol percentage)}$$

(1) number of monomer components n=2
(2) name of each monomer component $A_1$=VdF, $A_2$=HFP
(3) weight percentage of each monomer component of the target polymer composition is 60, 40(%)
(4) weight percentage of each monomer component of the initial monomer composition is 19, 81(%)
(5) B=monomer specific gravity 0.76/polymer specific gravity 1.80=0.42
(6) Composition weight ratio of additional monomers VdF:HFP is $$VdF:HFP = (60 - 19 \times 0.42):(40 - 81 \times 0.42)$$
$$= 52:6$$
$$= 90:10 \text{ (converted to weight percentage)}$$
$$= 95:5 \text{ (mol percentage)}$$

Acceptable range: VdF 90 to 100% by mol, HFP 0 to 10% by mol

As a specific example 2, described is the calculation method of the composition of additional monomers when the target polymer is $$VdF:TFE:HFP = 50:20:30 \text{ (weight ratio percentage)}$$
$$= 33:21:46 \text{ (mol percentage)}$$

(1) number of monomer components n=3
(2) name of each monomer component $A_1$=VdF, $A_2$=TFE, $A_3$=HFP
(3) weight percentage of each monomer component of the target polymer composition is 33, 21, 46(%)
(4) weight percentage of each monomer component of the initial monomer composition is 6, 5, 90(%)

(5) B=monomer specific gravity 0.69/polymer specific gravity 1.80=0.38
(6) Composition weight ratio of additional monomers VdF:TFE:HFP is $$VdF:TFE:HFP = (33 - 6 \times 0.38):(21 - 5 \times 0.38):(46 - 90 \times 0.38)$$
$$= 50:31:19 \text{ (converted to weight percentage)}$$
$$= 65:25:10 \text{ (mol percentage)}$$

Acceptable range: VdF 60 to 70% by mol, TFE 20 to 30% by mol, HFP 5 to 15% by mol By adding the additional monomers in the above composition weight ratio, a polymer can be obtained, which has few branched chains and little weight change in high temperatures and in which composition distribution is substantially suppressed. That is, a polymer can be obtained, which has little degradation of properties due to post-polymerization, can be produced by highly productive conditions, such as adjusting the space volume to any space volume, and furthermore, has favorable vulcanization properties.

In the preparation process of the present invention, polymerization is conducted under conditions of reduced temperature ($T_R$) of at least 0.95, preferably at least 0.97, and reduced pressure ($P_R$) of at least 0.80, preferably at least 0.85, which are found from the critical constant calculated from the composition ratio and the critical temperature and the critical pressure of each monomer in the gaseous phase of the reaction vessel using the Peng-Robinson formula. When the monomer mixture in the gaseous phase exceed both the reduced temperature and the reduced pressure, polymerization can be conducted at a high monomer density. As a result, because a polymer having few branches of the main chain and ion terminals can be obtained, in addition to increase of the polymerization rate, compression set is improved significantly. Herein, the reduced temperature is determined from reduced temperature $T_R = T/T_c$ (wherein T is the actual polymerization temperature and $T_c$ is the critical temperature calculated using the Peng-Robinson formula). In the same way, the reduced pressure is determined from reduced pressure $P_R = P/P_c$ (wherein P is the actual polymerization pressure and $P_c$ is the critical pressure calculated using the Peng-Robinson formula).

Described below is the Peng-Robinson formula, which determines the critical temperature and the critical pressure. It is commonly known that composition distribution tends to occur in the obtained polymer the higher the initial monomer density in the polymerization vessel is and that particularly, the monomer density of the initial monomers increases sharply from near the critical point. However, when at least two monomer components are copolymerized, the critical point of the gaseous phase monomer mixture varies depending on the type and composition ratio of the monomers. The Peng-Robinson formula is employed as a method for estimating the critical point of the monomer mixture from the critical temperature and critical pressure of each independent monomer and the initial monomer composition ratio. The principle of this formula is described in D. Y. Peng and D. B. Robinson, "A New Two-Constant Equation of State", Ind. Eng. Chem. Fundam., Vol. 15, (1976), pp. 59. 64. As an overview, the principle is based on the following formula and for actual calculation, a process simulator such as Aspen Plus (made by Aspen Technology, Inc.) can be used.

An outline of the Peng-Robinson formula is as follows.

$$P = RT/(V_m - b) - a/[V_m(V_m + b) + b(V_m - b)]$$
$$a = \sum_i \sum_j x_i x_j (a_i a_j)^{0.5}$$
$$b = \sum_i x b_i$$

In the above formula, $a_i$, $\alpha_i(T)$, $m_i$ and $b_i$ are respectively as defined below.

$$a_i = \alpha_i 0.45724 R^2 T_c^2 / P_c$$

$$\alpha_i(T) = [1 + m_i(1 - T_c^{0.5})]^2$$

$$m_i = 0.37464 + 1.54226\omega_i - 0.26992\omega_i^2$$

$$b_i = 0.0778 RT_c / P_c$$

Also, each parameter represents the following.
P: pressure
T: temperature
$V_m$: volume
R: gas constant
$X_i$: composition ratio of monomer component i
$T_c$: critical temperature of monomer component i
$P_c$: critical pressure of monomer component i
$\omega_i$: eccentric factor of monomer component i As a specific calculation example, the critical temperature and the critical pressure when the composition inside the polymerization vessel is VdF/HFP=36/64 (% by mol) are calculated by the Peng-Robinson formula using Aspen Plus Ver. 11.1 and $T_c$=87.7° C. and $P_c$=3.05 MPa. When converted by reduced temperature $T_R$=0.95 and reduced pressure $P_R$=0.80, the polymerization conditions in this case are T=at least 69.7° C. and P=at least 2.44 MPa.

When the reduced pressure ($P_R$) is less than 0.80 or the reduced temperature ($T_R$) is less than 0.95, the monomer concentration in the polymer particles does not reach saturation and not only does the polymerization rate decrease, but also obtaining the target polymer becomes difficult. Also, within the above temperature and pressure that satisfy the conditions calculated from the above formula, the polymerization temperature is more preferably 10 to 120° C., particularly preferably 30 to 100° C., and the polymerization pressure is preferably at least 3 MPa, more preferably at least 3.5 MPa, further preferably at least 4 MPa. Also, the upper limit of the pressure is not particularly limited, but in consideration of handling of the monomer and reaction facility costs, the pressure is preferably at most 15 MPa, more preferably at most 12 MPa.

Furthermore, stirring is preferably conducted. By stirring, the monomer concentration Cp in the polymer particles can be kept high throughout polymerization. The monomer concentration of the gaseous phase during polymerization is preferably maintained at 1.0 mol/liter or higher, more preferably 1.5 mol/liter or higher, particularly preferably 2.0 mol/liter or higher.

As the stirring means, for example, an anchor blade, a turbine blade or an inclined blade can be used. From the viewpoints that diffusion of the monomer and dispersion stability of the polymer are favorable, stirring is preferably conducted by a large-scale blade such as FULLZONE or MAXBLEND. The stirring machine can be a horizontal stirring machine or a vertical stirring machine.

As the polymer of the present invention, a copolymer of at least two kinds of fluoroolefin monomers or a copolymer of a fluoroolefin monomer and a non-fluoroolefin monomer can be used.

Examples of the fluoroolefin monomers are perfluoroolefin monomers such as tetrafluoroethylene (TFE), chlorotrifluoroethylene (CTFE), hexafluoropropylene (HFP), perfluoro(alkylvinyl ether) (PAVE),

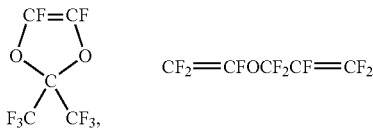

and non-perfluoroolefin monomers such as vinylidene fluoride (VdF), trifluoroethylene, vinyl fluoride, trifluoropropylene, pentafluoropropylene, tetrafluoropropylene and hexafluoroisobutene. Examples of PAVE are perfluoro(methyl vinyl ether) (PMVE), perfluoro(ethyl vinyl ether) (PEVE) and perfluoro(propyl vinyl ether) (PPVE).

Also, a fluoroolefin monomer containing a functional group can be used. An example of a fluoroolefin monomer containing a functional group is the formula:

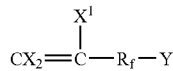

(wherein Y represents —$CH_2OH$, —COOH, —$SO_2F$, —$SO_3M$ (M is hydrogen, an $NH_4$ group or an alkali metal), carboxylate, a carboxyester group, an epoxy group or a nitrile group, X and $X^1$ are the same or different and are either a hydrogen atom or a fluorine atom, $R_f$ represents a divalent fluorine-containing alkylene group having 0 to 40 carbon atoms or a divalent fluorine-containing alkylene group having 0 to 40 carbon atoms and an ether bond). Specific examples are

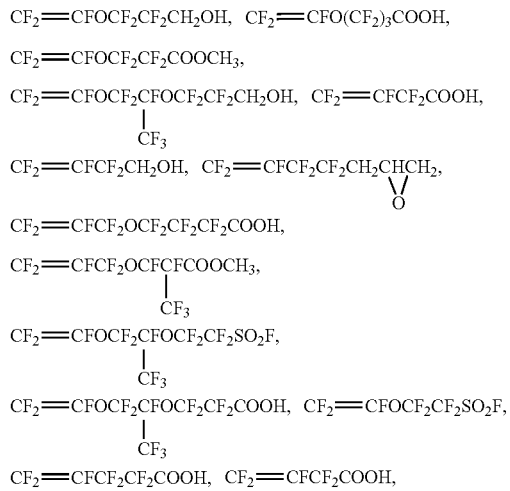

-continued

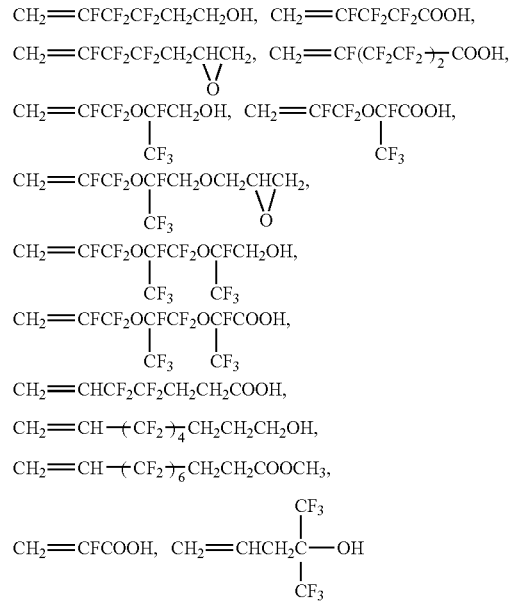

Also, iodine-containing monomers, for example iodides of perfluorovinyl ether such as perfluoro(6,6-dihydro-6-iodo-3-oxa-1-hexene) and perfluoro(5-iodo-3-oxa-1-pentene) described in JP-B-5-63482 and JP-A-62-12734, can be copolymerized as the non-perfluoroolefin monomer.

Examples of the non-perfluoroolefin monomer are α-olefin monomers having 2 to 10 carbon atoms such as ethylene (ET), propylene, butene and pentene and alkyl vinyl ethers wherein the alkyl group has 1 to 20 carbon atoms such as methyl vinyl ether, ethyl vinyl ether, propyl vinyl ether, cyclohexyl vinyl ether, hydroxybutyl vinyl ether and butyl vinyl ether. Of these, the copolymer preferably comprises vinylidene fluoride and hexafluoropropylene or vinylidene fluoride, hexafluoropropylene and tetrafluoroethylene, for the object of preparing a fluorine-containing polymer.

The fluorine-containing polymer obtained at this time preferably has a composition of vinylidene fluoride: hexafluoropropylene in a mol ratio of 9:1 to 5:5, more preferably 8.5:1.5 to 6:4, and preferably contains 0 to 40% by mol of tetrafluoroethylene, more preferably 0 to 30% by mol.

When the mol ratio of vinylidene fluoride is more than 9, elasticity as a polymer tends to become poor. When the mol ratio is less than 5, low temperature properties tend to become poor.

In the same way, when the tetrafluoroethylene is more than 40% by mol, elasticity as a polymer and low temperature properties tend to become poor.

In the preparation process of the present invention, an oil-soluble peroxide can be used as the polymerization initiator. However, peroxycarbonates such as di-isopropylperoxydicarbonate (IPP) and di-n-propylperoxydicarbonate (NPP), which are typical oil-soluble initiators, have the risk of explosion and are expensive. Furthermore, there is the problem that scale tends to adhere to the walls of the polymerization vessel during the polymerization reaction and in the present invention, an aqueous radical polymerization initiator is preferably used. Preferable examples of the aqueous radical polymerization initiator are ammonium salts, potassium salts and sodium salts of persulfuric acid, perboric acid, perchloric acid, perphosphoric acid and percarbonic acid and particularly, ammonium persulfate and potassium persulfate are preferable.

The amount of the polymerization initiator is not particularly limited and at least an amount by which the polymerization rate does not decrease significantly (for example, few ppm based on water) can be added all at once at the beginning of polymerization or sequentially or continuously. The upper limit is the range by which polymerization reaction heat can be removed, in consideration of the machine, and is preferably 50 to 500 ppm.

In the preparation process of the present invention, an emulsifier, a molecular weight adjuster and a pH adjuster can also be added. The molecular weight adjuster can be added all at once in the beginning or can be added successively or divided into portions.

As the emulsifier, a nonionic surfactant, an anionic surfactant and a cationic surfactant can be used and particularly, a fluorine-type anionic surfactant such as ammonium perfluorooctanate is preferable. The amount (based on polymerization water) is preferably 50 to 5000 ppm.

Examples of the molecular weight adjuster are esters such as dimethyl malonate, diethyl malonate, methyl acetate, ethyl acetate, butyl acetate and dimethyl succinate, isopentane, isopropanol, acetone, various mercaptanes, carbon tetrachloride, cyclohexane, monoiodo methane, 1-iodomethane, 1-iodo-n-propane, isopropyl iodide, diiodo methane, 1,2-diiodomethane and 1,3-diiodo-n-propane.

Also, a buffer can be added accordingly, but the amount thereof is within the range that the effects of the present invention are not lost.

The fluorine-containing polymer composition of the present invention comprises the fluorine-containing polymer, a curing agent and a vulcanization aid.

The curing agent that can be used in the present invention is selected accordingly depending on the vulcanization type that is employed. As the vulcanization type, polyamine vulcanization type, polyol vulcanization type or peroxide vulcanization type can be employed, but the effects of the present invention are exhibited significantly when vulcanized by polyol vulcanization.

Examples of the curing agent are polyhydroxy compounds such as bisphenol AF, hydroquinone, bisphenol A and diaminobisphenol AF in polyol vulcanization, organic peroxides such as α-α'-bis(t-butylperoxy)diisopropylbenzene, 2,5-dimethyl-2,5-di(t-butylperoxy)hexane and dicumylperoxide in peroxide vulcanization and polyamine compounds such as hexamethylenediamine carbamate and N,N'-dicinnamylidene-1,6-hexamethylenediamine in polyamine vulcanization. However, the curing agent is not limited thereto.

The amount of the curing agent is 0.01 to 10 parts by weight, preferably 0.1 to 5 parts by weight, based on 100 parts by weight of the polymer. When the amount of the curing agent is less than 0.01 part by weight, properties of the vulcanized flurorubber tend to be lost, as the vulcanization degree is insufficient. When the amount of the curing agent is more than 10 parts by weight, the vulcanization density becomes too high that the vulcanization becomes long, thus being economically unfavorable.

Examples of the accelerator are organic bases that are usually used for vulcanization of an elastomer, such as various quaternary ammonium salts, quaternary phosphonium salts, cyclic amines and monofunctional amine compounds. Specific examples are quaternary ammonium salts such as tetrabutylammmonium bromide, tetrabutylammmonium chloride, benzyltributylammmonium chloride, benzyltriethylammmonium chloride, tetrabutylammonium hydrogen sulfate and tetrabutylammonium hydroxide; quaternary phosphonium salts such as benzyltriphenylphosphonium chloride, tributylallylphosphonium chloride, tributyl-2-methoxypropylphosphonium chloride and benzylphenyl(dimethylamino)phosphonium chloride; monofunctional amines such as benzylmethyl amine and benzylethanol amine; and cyclic amines such as 1,8-diazabicyclo[5,4,0]-undec-7-ene.

The amount of the accelerator is 0.01 to 10 parts by weight, preferably 0.1 to 5.0 parts by weight, based on 100 parts by weight of the polymer. When the amount of the accelerator is less than 0.01 part by weight, the vulcanization time tends to become too long for practical use and when the amount is more than 10 parts by weight, the vulcanization time becomes too fast and also, compression set of the molded article tends to decrease.

Also, the usual additives such as a filler, a processing aid, carbon black, an inorganic filler, metal oxides such as magnesium oxide and metal hydroxides such as calcium hydroxide can be used as long as the effects of the present invention are not lost.

The methods for preparing and curing the composition of the present invention are not particularly limited and conventionally known methods can be employed, such as compression molding, extrusion molding, transfer molding and injection molding.

In the above molding methods, defoaming is preferably conducted by reducing pressure during molding. Defoaming by reducing pressure means that defoaming is conducted in the state of at most 0.10 MPa (absolute pressure), preferably at most 0.05 MPa, more preferably at most 0.01 MPa, when molding the fluorine-containing polymer composition. The fluorine-containing polymer of the present invention has extremely low viscosity and therefore, the bubbles in the composition cannot be removed during molding by the usual molding method wherein pressure is not reduced. As a result, the molded article frequently contains bubbles and is foamed. Also, the entire molding process can be conducted under reduced pressure.

The fluorine-containing polymer composition of the present invention is characterized in that the viscosity is extremely low and vulcanized fluororubber can be prepared by methods such as the mold-in-place gasket method, cure-in-place gasket method and foamed-in-place gasket method, which are conventionally used for liquid silicone rubber.

In the above molding methods, an alkoxysilyl group, which is a functional group that enables curing reaction in low temperatures, can be introduced into the polymer by a known method.

Also, the composition of the present invention preferably satisfies the following (1) to (3).

(1) The fluorine-containing polymer that is used has Mooney viscosity of at most 15, preferably at most 12, at 121° C. The conventional fluorine-containing polymer has extremely high viscosity and therefore requires special processing machinery and adjustments such as sacrificing productivity. However, if the Mooney viscosity is 15 or lower, common processing machinery can be used and high productivity is obtained.

(2) Furthermore, the fluorine-containing polymer that is used substantially does not contain iodine.

Iodine is substantially not contained when the iodine content in the polymer is 10 ppm or less. Conventionally, it is known that a polymer having weight average molecular weight/number average molecular weight of at most 2.0 can easily be prepared when iodine is contained. However, according to the present invention, a polymer having weight average molecular weight/number average molecular weight of at most 3.0 can be prepared even when iodine is substantially not contained.

(3) The compression set when the following standard compositions 1 or 2 are vulcanized under the standard vulcanization conditions 1 or 2 is at most 30%, more preferably at least 12% and at most 25%. When the compression set is more than 30%, sealing properties decrease, the temperature at which continuous use is possible declines and the period of use tends to become short.

| (Standard composition 1) | |
|---|---|
| Fluorine-containing polymer | 100 parts by weight |
| Bisphenol AF | 2.17 parts by weight |
| Benzyltriphenylphosphonium chloride | 0.43 part by weight |
| High-activity magnesium oxide | 3 parts by weight |
| Carbon black MT-C | 20 parts by weight |
| Calcium hydroxide | 6 parts by weight |
| (Standard composition 2) | |
| Fluorine-containing polymer | 100 parts by weight |
| Bisphenol AF | 2.17 parts by weight |
| Benzyltriphenylphosphonium chloride | 0.77 part by weight |
| High-activity magnesium oxide | 3 parts by weight |
| Carbon black MT-C | 20 parts by weight |
| Calcium hydroxide | 6 parts by weight |

(Standard Vulcanization Conditions 1)
Kneading method: Roll kneading
Press vulcanization: 10 minutes at 170° C.
[when the pressing pressure reaches 2 to 3 MPa, pressure is reduced for 1 minute (about 0.01 MPa)]
Oven vulcanization: 24 hours at 230° C.

(Standard Vulcanization Conditions 2)
Kneading method: Roll kneading
Press vulcanization: 15 minutes at 180° C.
[when the pressing pressure reaches 2 to 3 MPa, pressure is reduced for 1 minute (about 0.01 MPa)]
Oven vulcanization: 24 hours at 230° C.

According to such a composition, a vulcanized fluororubber is provided, which has high vulcanization efficiency, excellent mold processability and low compression set, although the viscosity is extremely low.

Also, in the fluorine-containing polymer of the present invention, the weight average molecular weight/number average molecular weight measured by GPC is preferably at most 3.0, more preferably at most 2.8 and at least 1.2. When the weight average molecular weight/number average molecular weight is more than 3.0, sufficient vulcanization tends to become difficult, particularly due to the low molecular weight components. The weight average molecular weight (Mw) measured by GPC is preferably 20,000 to 600,000. When Mw is less than 20,000, vulcanizability tends to become poor and when Mw is more than 600,000, molding by the usual processing method tends to become difficult, as viscosity becomes high.

The new fluorine-containing polymer of the present invention satisfies the following (4) to (7).

(4) The composition of the fluorine-containing polymer is vinylidene fluoride:hexafluoropropylene in a mol ratio of 9:1 to 5:5, more preferably 8.5:1.5 to 6:4, and preferably contains 0 to 40% by mol, more preferably 0 to 30% by mol, of tetrafluoroethylene.

When the mol ratio of vinylidene fluoride is more than 9, elasticity as a polymer tends to become poor. When the mol ratio is less than 5, low temperature properties tend to become poor.

In the same way, when the tetrafluoroethylene is more than 40% by mol, elasticity as a polymer and low temperature properties tend to become poor.

(5) The weight average molecular weight of the fluorine-containing polymer that is used is at most 140,000, more preferably at most 120,000. When the weight average molecular weight is more than 140,000, the difference from the conventional fluorine-containing polymer tends to become smaller in terms of properties such as compression set.

Also, the weight average molecular weight/number average molecular weight is at most 3.0, preferably at most 2.8 and at least 1.2. When the weight average molecular weight/number average molecular weight is more than 3.0, sufficient vulcanization may not be possible due to the low molecular weight components.

The fluorine-containing polymer of the present invention, which has small weight average molecular weight (Mw) and small weight average molecular weight/number average molecular weight, has favorable processability and can keep the possibility of vulcanization properties becoming poor to a minimum.

(6) Furthermore, the fluorine-containing polymer that is used substantially does not contain iodine.

Iodine is substantially not contained when the iodine content in the polymer is 10 ppm or less. Conventionally, it is known that a polymer having weight average molecular weight/number average molecular weight of at most 2.0 can easily be prepared when iodine is contained. However, according to the present invention, a polymer having weight average molecular weight/number average molecular weight of at most 3.0 can be prepared even when iodine is substantially not contained.

(7) The compression set when the standard compositions of (3) are vulcanized under the same standard vulcanization conditions is at most 30%, more preferably at least 12% and at most 25%. When the compression set is more than 30%, sealing properties decrease, the temperature at which continuous use is possible declines and the period of use tends to become short.

Such a fluorine-containing polymer has a sharp molecular weight distribution and because there are few low molecular weight components that are difficult to vulcanize, is excellent in compression set. Also, because there are few high molecular weight components, the torque increase when curing is sharp and scorch time tends to become long.

Furthermore, by significantly decreasing the molecular weight compared to the conventionally known fluorine-containing polymer, mold processing requiring favorable flowability becomes possible and a new vulcanized fluororubber is provided, which is close to the conventional in terms of properties.

The fluorine-containing polymer composition of the present invention comprises the fluorine-containing polymer, a curing agent and an accelerator.

As the curing agent and accelerator, the same curing agents and accelerators as those described above are used. Also, the amounts thereof can be the same as above.

The fluorine-containing polymer obtained by the above preparation method, which has Mooney viscosity of at most 15 at 121° C. or weight average molecular weight of at most 140,000 and substantially does not contain iodine, exhibits favorable vulcanizability and vulcanization properties and therefore, is favorably used as a processing aid, from the viewpoint that decrease in properties is extremely small when mixed.

Also, another composition of the present invention comprising the above processing aid and a fluorine-containing polymer having Mooney viscosity of at most 15 at 121° C. is preferable from the viewpoint of effectively decreasing the viscosity of the polymer. The above processing aid is preferably contained in the composition in an amount of at least 5% by weight. When less than 5% by weight, the effects as a processing aid may not be achieved.

Evaluation Methods

<Measurement of Polymer Composition>
$^{19}$F-NMR: AC300P model made by Bruker BioSpin K.K.
 FX100 model made by JEOL <Calculation by Peng-Robinson Formula>
Aspen Plus Ver. 11.1 (made by Aspen Tech) was used. The values in the software were used for all of the critical temperature and critical pressure of each monomer and the parameters.
$T_c$: VdF 29.65° C.,
 TFE 33.3° C.,
 HFP 85.0° C.
$P_c$: VdF 4.46 MPa/SQCM,
 TFE 3.94 MPa/SQCM,
 HFP 3.21,MPa/SQCM
ω: VdF 0.136,
 TFE 0.226,
 HFP 0.382

<Weight Average Molecular Weight (Mw) and Number Average Molecular Weight (Mn)>
Machine: HLC-8000 (made by Tosoh Corporation)
Column:: TSK gel GMH$_{XL}$-H 2 columns
 TSK gel G3000H$_{XL}$ 1 column
 TSK gel G2000H$_{XL}$ 1 column
Detector: differential refractometer
Developing solvent: tetrahydrofurane
Temperature: 35° C.
Sample concentration: 0.2% by weight
Standard sample: various monodispersional polystyrenes ((Mw/Mn)=1.14(Max)), TSK standard POLYSTYRENE (made by Tosoh Corporation)

<Mooney Viscosity>
The Mooney viscosity is measured according to ASTM-D1646 and JIS K6300.
Measurement instrument: Automatic Mooney Viscometer made by Ueshima Seisakusho
Rotor rotational speed: 2 rpm
Measurement temperature 121° C.

<Compression Set>
The standard composition 1 described below is subjected to primary press vulcanization and secondary oven vulcanization under the standard vulcanization conditions 1 and the standard composition 2 is subjected to primary press vulcanization and secondary oven vulcanization under the standard vulcanization conditions 2 to prepare an O-ring (P-24). The compression set (CS) after primary press vulcanization and the compression set after secondary oven vulcanization are measured according to JIS-K6301 (a sample held at 200° C. for 72 hours under 25% compression and then left for 30 minutes in a constant temperature room of 25° C. is measured).

(Standard Composition 1)

| | |
|---|---|
| Fluorine-containing polymer | 100 parts by weight |
| Bisphenol AF | 2.17 parts by weight |
| Benzyltriphenylphosphonium chloride | 0.43 part by weight |
| High-activity magnesium oxide | 3 parts by weight |
| Carbon black MT-C | 20 parts by weight |
| Calcium hydroxide | 6 parts by weight |

(Standard Vulcanization Conditions 1)
Kneading method: Roll kneading
Press vulcanization: 10 minutes at 170° C.
[when the pressing pressure reaches 2 to 3 MPa, pressure is reduced for 1 minute (about 0.01 MPa)]
Oven vulcanization: 24 hours at 230° C.

(Standard Composition 2)

| | |
|---|---|
| Fluorine-containing polymer | 100 parts by weight |
| Bisphenol AF | 2.17 parts by weight |
| Benzyltriphenylphosphonium chloride | 0.77 part by weight |
| High-activity magnesium oxide | 3 parts by weight |
| Carbon black MT-C | 20 parts by weight |
| Calcium hydroxide | 6 parts by weight |

(Standard Vulcanization Conditions 2)
Kneading method: Roll kneading
Press vulcanization: 15 minutes at 180° C.
[when the pressing pressure reaches 2 to 3 MPa, pressure is reduced for 1 minute (about 0.01 MPa)]
Oven vulcanization: 24 hours at 230° C.

<100% Modulus (M100)>
The above standard compositions 1 and 2 are subjected to primary press vulcanization and secondary oven vulcanization under the above standard vulcanization conditions 1 and 2 respectively to prepare a sheet of 2 mm thickness and the 100% modulus is measured according to JIS-K6251.

<Tensile Strength at Break (Tb) and Elongation at Break (Eb)>
The above standard compositions 1 and 2 are subjected to primary press vulcanization and secondary oven vulcanization under the above standard vulcanization conditions 1 and 2 respectively to prepare a sheet of 2 mm thickness and the tensile strength at break and elongation at break are measured according to JIS-K6251.

<Hardness (Hs)>
The above standard compositions 1 and 2 are subjected to primary press vulcanization and secondary oven vulcanization under the above standard vulcanization conditions 1 and 2 respectively to prepare a sheet of 2 mm thickness and the hardness is measured according to JIS-K6253.

<Vulcanization Properties>
The vulcanization curve at 170° C. is found in primary press vulcanization using JSR curastometer model II and model V and the minimum viscosity (ML), the vulcanization degree (MH), the induction time ($T_{10}$) and the optimum vulcanization time ($T_{90}$) are found.

REFERENCE EXAMPLE 1

(Preparation of Seed Polymer Particles)

A 1.8 liter polymerization vessel equipped with an electromagnetic induction type stirring device as the stirring device was charged with 720 g of deionized water, 290 g of a 10% by weight aqueous solution of ammonium perfluorooctanate and 0.6 g of diethyl malonate. After the system was sufficiently replaced with nitrogen gas, the pressure was reduced. This procedure was repeated 3 times. 20 g of VdF and 51 g of HFP were added under reduced pressure and the temperature was raised to 80° C. while stirring. Subsequently, 0.02 g of ammonium persulfate (APS) dissolved in 0.6 g of deionized water was injected by nitrogen gas to start polymerization. The polymerization pressure was set to 2 MPa and in order to compensate for the pressure decrease during polymerization, a monomer mixture of VdF/HFP (78/22 (% by mol)) was supplied successively and polymerization was conducted while stirring. After 30 minutes, stirring was stopped and the monomers were discharged to stop polymerization.

REFERENCE EXAMPLE 2

(Preparation of Seed Polymer Particles)

A 1.8 liter polymerization vessel equipped with an electromagnetic induction type stirring device as the stirring device was charged with 809 g of deionized water, 200 g of a 10% by weight aqueous solution of ammonium perfluorooctanate and 0.6 g of diethyl malonate. After the system was sufficiently replaced with nitrogen gas, the pressure was reduced. This procedure was repeated 3 times. 0.5 mL of isopentane was added under reduced pressure and each of the monomers were added so that the composition inside the vessel at 80° C. became VdF/TFE/HFP=29.0/13.0/58.0% by mol and the pressure inside the vessel became 1.4 MPa. After the temperature was increased, 0.67 g of ammonium persulfate (APS) dissolved in 20 g of deionized water was injected by nitrogen gas to start polymerization. The polymerization pressure was set to 1.4 MPa and in order to compensate for the pressure decrease during polymerization, a monomer mixture of VdF/TFE/HFP (50/20/30 (% by mol)) was supplied successively and polymerization was conducted while stirring. 320 g of monomers was supplied into the vessel until polymerization was completed.

The weight of the obtained emulsion was 1285 g, the polymer concentration was 24.8% by weight and the number of polymer particles was $1.0 \times 10^{15}$ particles/l g of water. After 360 minutes, stirring was stopped and the monomers were discharged to stop polymerization.

EXAMPLE 1

(Preparation of Fluorine-Containing Polymer)

A 1.8 liter polymerization vessel equipped with the same stirring device as in Reference Example 1 was charged with 1258 g of deionized water, 26.65 g of an aqueous, dispersion of the seed polymer particles prepared in Reference Example 1 (16.3% by weight concentration) and 4.91 g of diethyl malonate. After the system was sufficiently replaced with nitrogen gas, the pressure was reduced. This procedure was repeated 3 times. 76 g of VdF and 323 g of HFP were added under reduced pressure and the temperature was raised to 80° C. while stirring. Subsequently, 0.195 g of APS dissolved in 20 g of deionized water was injected by nitrogen gas to start polymerization and polymerization was continued under the following conditions (a) to (c). After 3 hours, stirring was stopped and the monomers were discharged to stop polymerization.

The composition ratio (mol) of the gaseous phase monomers VdF/HFP was 36/64 before polymerization and 38/62 after polymerization.

(a) The critical temperature and critical pressure of the composition VdF/HFP=36/64 (% by mol) in the polymerization vessel were calculated by the Peng-Robinson formula using Aspen Plus Ver. 11.1 and $T_c$=87.7° C. and $P_c$=3.05 MPa. Furthermore, conversion was conducted by reduced temperature ($T_R$) 0.95 and reduced pressure ($P_R$) 0.80 and T=69.7° C. and P=2.44 MPa. The polymerization conditions 20 of the present Example are the reduced temperature or higher and the reduced pressure or higher.

(b) To maintain the total concentration of monomers in the gaseous phase at 6 mol/liter, a monomer mixture of VdF/HFP (95/5% by mol) was supplied successively and the pressure of the gaseous phase was maintained at 6 MPa (absolute pressure).

(c) The stirring rate is maintained at 570 rpm. 408 g of the fluorine-containing polymer was obtained. The weight average molecular weight Mw measured by GPC was 176,000, the number average molecular weight Mn measured by GPC was 87,000 and Mw/Mn measured by GPC was 2.0. Also, the composition of the polymer measured by $^{19}$F-NMR was VdF/HFP=77.4/22.6 (% by mol).

EXAMPLE 2

A 1.8 liter polymerization vessel equipped with the same stirring device as in Reference Example 1 was charged with 968 g of deionized water, 17.4 g of an aqueous dispersion of the seed polymer particles prepared in Reference Example 1 (16.3% by weight concentration) and 14.0 g of diethyl malonate. After the system was sufficiently replaced with nitrogen gas, the pressure was reduced. This procedure was repeated 3 times. 117 g of VdF and 508 g of HFP were added under reduced pressure and the temperature was raised to 80° C. while stirring. Subsequently, 0.3 g of APS dissolved in 17 g of deionized water was injected by nitrogen gas to start polymerization and polymerization was continued under the following conditions (a) and (b). After 3 hours, stirring was stopped and the monomers were discharged to stop polymerization.

The composition ratio (mol) of the gaseous phase monomers VdF/HFP was 36/64 before polymerization and 37/63 after polymerization.

(a) To maintain the total concentration of monomers in the gaseous phase at 6 mol/liter, a monomer mixture of VdF/HFP (95/5% by mol) was supplied successively and the pressure of the gaseous phase was maintained at 6 MPa (absolute pressure).

(b) The stirring rate is maintained at 570 rpm.

411 g of the fluorine-containing polymer was obtained. The weight average molecular weight Mw measured by GPC was 107,000, the number average molecular weight Mn measured by GPC was 43,000 and Mw/Mn measured by GPC was 2.5. Also, the composition of the polymer measured by $^{19}$F-NMR was VdF/HFP=76.9/23.1 (% by mol).

EXAMPLE 3

The fluorine-containing polymer was prepared in the same manner as in Example 2, except that 8 g of diethyl malonate and 0.25 g of APS were used.

The composition ratio (mol) of the gaseous phase monomers VdF/HFP was 36/64 before polymerization and 36/64 after polymerization.

429 g of the fluorine-containing polymer was obtained. The weight average molecular weight Mw measured by GPC was 146,000, the number average molecular weight Mn measured by GPC was 68,000 and Mw/Mn measured by GPC was 2.1. Also, the composition of the polymer measured by $^{19}$F-NMR was VdF/HFP=76.8/23.2 (% by mol).

EXAMPLE 4

The fluorine-containing polymer was prepared in the same manner as in Example 2, except that 20 g of diethyl malonate and 0.35 g of APS were used.

The composition ratio (mol) of the gaseous phase monomers VdF/HFP was 36/64 before polymerization and 36/64 after polymerization.

408 g of the fluorine-containing polymer was obtained. The weight average molecular weight Mw measured by GPC was 72,000, the number average molecular weight Mn measured by GPC was 33,000 and Mw/Mn measured by GPC was 2.2. Also, the composition of the polymer measured by $^{19}$F-NMR was VdF/HFP=76.1/23.9 (% by mol).

COMPARATIVE EXAMPLE 1

The fluorine-containing polymer was prepared in the same manner as in Example 1, except that the initially charged monomers were 125 g of VdF and 450 g of HFP, 4.0 g of diethyl malonate and 0.15 g of APS were used and the composition ratio of the successively supplied monomer was VdF/HFP=78/22 (% by mol). The composition ratio (mol) of the gaseous phase monomers VdF/HFP was 42/58 before polymerization and 32/68 after polymerization.

320 g of the fluorine-containing polymer was obtained. The weight average molecular weight Mw measured by the above method was 220,000, the number average molecular weight Mn was 96,000 and Mw/Mn was 2.3. Also, the composition of the polymer measured by $^{19}$F-NMR was VdF/HFP=77.7/22.3 (% by mol).

EXAMPLES 5 TO 7 AND COMPARATIVE EXAMPLES 2 TO 3

Vulcanized fluororubber was obtained according to the following composition and vulcanization conditions using the fluorine-containing polymers obtained in Examples 1 to 3 and Comparative Example 1 and G790 (fluorine-containing polymer, available from Daikin Industries Ltd.).

(Standard Composition 1)

| | |
|---|---|
| Fluorine-containing polymer | 100 parts by weight |
| Bisphenol AF | 2.17 parts by weight |
| Benzyltriphenylphosphonium chloride | 0.43 part by weight |
| High-activity magnesium oxide | 3 parts by weight |
| Carbon black MT-C | 20 parts by weight |
| Calcium hydroxide | 6 parts by weight |

(Standard Vulcanization Conditions 1)
Kneading method: Roll kneading
Press vulcanization: 10 minutes at 170° C.
[when the pressing pressure reaches 2 to 3 MPa, pressure is reduced for 1 minute (about 0.01 MPa)]
Oven vulcanization: 24 hours at 230° C.

EXAMPLE 8

Vulcanized fluororubber was obtained according to the same composition and vulcanization conditions as in Examples 5 to 7 using the fluorine-containing polymer obtained in Example 4, except that in the standard composition shown in Examples 5 to 7, the amount of benzyltriphenylphosphonium chloride was changed to 0.50 part by weight.

The obtained vulcanized fluororubber was evaluated according to the above evaluation methods and the results are shown in Table 1.

TABLE 1

| | | Ex. | | | | Com. Ex. | |
|---|---|---|---|---|---|---|---|
| | unit | 5 | 6 | 7 | 8 | 2 | 3 |
| Mooney viscosity of polymer (121° C.) | | — | 2.2 | 13.5 | — | 49 | — |
| Mooney viscosity of composition (100° C.) | | 48.9 | 5.4 | 22.5 | 1.4 | 67 | 48 |
| MW/MN | | — | 2.5 | 2.1 | 2.2 | 2.1 | — |
| 100% modulus | MPa | 5.0 | 3.6 | 4.2 | 3.2 | 4.2 | 5 |
| Tensile strength at break | MPa | 13.7 | 11.1 | 13.6 | 9.4 | 13.4 | 14.2 |
| Elongation at break | % | 242 | 250 | 252 | 257 | 260 | 227 |
| Hardness (shore A) peak value | | 76 | 76 | 74 | 75 | 73 | 73 |
| Compression set (200° C. × 72 hr) | % | 10.6 | 19.3 | 14.3 | 26.1 | 10.6 | 17.4 |
| Curastometer model II (170° C.) | | | | | | | |
| Minimum viscosity (ML) | Kgf | 0.11 | 0.01 | 0.04 | — | 0.08 | 0.11 |
| Vulcanization degree (MH) | Kgf | 3.18 | 0.80 | 2.08 | — | 3.09 | 3.43 |
| Induction time (T10) | min. | 4.20 | 8.20 | 4.70 | — | 3.50 | 3.00 |
| Optimum vulcanization time (T90) | min. | 5.70 | 16.40 | 5.90 | — | 4.70 | 3.80 |

TABLE 1-continued

|  | unit | Ex. 5 | Ex. 6 | Ex. 7 | Ex. 8 | Com. Ex. 2 | Com. Ex. 3 |
|---|---|---|---|---|---|---|---|
| Curastometer model V (170° C.) | | | | | | | |
| Minimum viscosity (ML) | Kgf | 1.2 | 0.1 | 0.4 | 0.0 | 1.11 | — |
| Vulcanization degree (MH) | Kgf | 18.1 | 11.3 | 15.5 | 9.0 | 17.49 | — |
| Induction time (T10) | min. | 4.90 | 5.50 | 5.00 | 5.30 | 4.25 | — |
| Optimum vulcanization time (T90) | min. | 6.30 | 6.50 | 6.00 | 6.60 | 5.56 | — |
| Mooney scorch (T5)(145° C.) | min. | 20.5 | 29.1 | 21.8 | 32.7 | 13.8 | 13.4 |

EXAMPLES 9 AND 10

The fluorine-containing polymer obtained in Example 2 was added as a processing aid to a fluorine-containing polymer (G716 (100%), available from Daikin Industries Ltd., Mooney viscosity: 65). The mixing ratio was processing aid:fluorine-containing polymer=1:4 and 1:1 in weight ratio respectively. The composition ratio other than the processing aid and the vulcanization conditions are the same as in Examples 5 to 7.

The obtained vulcanized fluororubber was evaluated according to the above evaluation methods and the results are shown in Table 2.

COMPARATIVE EXAMPLE 4

Vulcanized fluororubber was obtained under the same conditions as in Examples 5 to 7, except that a fluorine-containing polymer (G716 (100%), available from Daikin Industries Ltd., Mooney viscosity: 65) was used. A processing aid was not used.

TABLE 2

|  | unit | Com. Ex. 4 | Ex. 9 | Ex. 10 |
|---|---|---|---|---|
| Composition | | | | |
| Polymer of Ex. 2 | parts by weight | — | 20 | 50 |
| G716 | parts by weight | 100 | 80 | 50 |
| Mooney viscosity of composition (100° C.) | | 104.0 | 79.3 | 50.0 |
| 100% modulus | MPa | 4.7 | 4.3 | 4.1 |
| Tensile strength at break | MPa | 13.9 | 13.2 | 12.1 |
| Elongation at break | % | 251.7 | 248.3 | 245.0 |
| Hardness (shore A) peak value | | 72.9 | 71.9 | 73.2 |
| Compression set (200° C. × 72 hr) | % | 15.7 | 16.2 | 17.0 |
| Curastometer model II (170° C.) | | | | |
| Minimum viscosity (ML) | Kgf | 0.21 | 0.12 | 0.05 |
| Vulcanization degree (MH) | Kgf | 4.30 | 3.60 | 2.20 |
| Induction time (T10) | min. | 2.65 | 3.10 | 3.85 |
| Optimum vulcanization time (T90) | min. | 3.65 | 4.10 | 5.10 |
| Mooney scorch (T5)(145° C.) | min. | 9.5 | 11.7 | 16.7 |

By compounding the processing aid of the present invention and a fluorine-containing polymer in a ratio of 1:1 (weight ratio), the compression set changes only slightly from 15.7% to 17.0%, although the Mooney viscosity of the composition decreases from 104 to 50.

EXAMPLE 11

(Preparation of Fluorine-Containing Polymer)

A 1.8 liter polymerization vessel equipped with the same stirring device as in Reference Example 1 was charged with 970 g of deionized water, 27 g of an aqueous dispersion of the seed polymer particles prepared in Reference Example 1 (28.5% by weight concentration) and 4 g of diethyl malonate. After the system was sufficiently replaced with nitrogen gas, the pressure was reduced. This procedure was repeated 3 times. 17 g of VdF, 21 g of TFE and 536 g of HFP were added under reduced pressure and the temperature was raised to 80° C. while stirring. Subsequently, 0.2 g of APS dissolved in 15 g of deionized water was injected by nitrogen gas to start polymerization and polymerization was continued under the following conditions (a) to (c). After 3 hours, APS was added in amount of half of the initial amount while stirring. 4 hours later, stirring was stopped and the monomers were discharged to stop polymerization.

The ratio of the gaseous phase monomers was VdF/TFE/HFP=6.0/4.6/89.4 before polymerization and 6.6/4.3/89.1 after polymerization.

(a) The critical temperature and critical pressure of the composition VdF/TFE/HFP=6.0/4.6/89.4 (% by mol) in the polymerization vessel was calculated by the Peng-Robinson formula using Aspen Plus Ver. 11.1 and $T_c$=88° C. and $P_c$=3.0 MPa. Furthermore, conversion was conducted by reduced temperature ($T_R$) 0.95 and reduced pressure ($P_R$) 0.80 and T=70° C. and P=2.4 MPa. The polymerization conditions of the present Example are the reduced temperature or higher and the reduced pressure or higher.

(b) To maintain the total concentration of monomers in the gaseous phase at 5 mol/liter, a monomer mixture of VdF/TFE/HFP (67.5/24/8.5% by mol) was supplied successively and the pressure of the gaseous phase was maintained at 3.5 MPa (absolute pressure).

(c) The stirring rate is maintained at 570 rpm.

367 g of the fluorine-containing polymer was obtained. The weight average molecular weight Mw measured by GPC was 120,000, the number average molecular weight Mn measured by GPC was 66,000 and Mw/Mn measured by GPC was 1.9. Also, the composition of the polymer measured by $^{19}$F-NMR was VdF/TFE/HFP=50.9/20.7/28.4 (% by mol).

EXAMPLE 12

A 1.8 liter polymerization vessel equipped with the same stirring device as in Reference Example 1 was charged with 970 g of deionized water, 27 g of an aqueous dispersion of the seed polymer particles prepared in Reference Example 2 (28.5% by weight concentration) and 8 g of diethyl malonate. After the system was sufficiently replaced with nitrogen gas, the pressure was reduced. This procedure was repeated 3 times. 17 g of VdF, 21 g of TFE and 536 g of HFP were added under reduced pressure and the temperature was raised to 80° C. while stirring. Subsequently, 0.25 g of APS dissolved in 15 g of deionized water was injected by nitrogen gas to start polymerization and polymerization was continued under the following conditions (a) to (c). 3 hours and 6 hours after the beginning of polymerization, APS was added in amount of half of the initial amount. 7.3 hours later, stirring was stopped and the monomers were discharged to stop polymerization.

The ratio of the gaseous phase monomers was VdF/TFE/HFP=6.4/5.2/88.4 before polymerization and 5.1/4.1/90.8 after polymerization.

(a) The critical temperature and critical pressure of the composition VdF/TFE/HFP=6.4/5.2/88.4 (% by mol) in the polymerization vessel was calculated by the Peng-Robinson formula using Aspen Plus Ver. 11.1 and $T_c$=88° C. and $P_c$=3.0 MPa. Furthermore, conversion was conducted by reduced temperature ($T_R$) 0.95 and reduced pressure ($P_R$) 0.80 and T=70° C. and P=2.4 MPa. The polymerization conditions of the present Example are the reduced temperature or higher and the reduced pressure or higher.

(b) To maintain the total concentration of monomers in the gaseous phase at 5 mol/liter, a monomer mixture of VdF/TFE/HFP (67.5/24/8.5% by mol) was supplied successively and the pressure of the gaseous phase was maintained at 3.5 MPa (absolute pressure).

(c) The stirring rate is maintained at 570 rpm.

397 g of the fluorine-containing polymer was obtained. The weight average molecular weight Mw measured by GPC was 730,000, the number average molecular weight Mn measured by GPC was 42,000 and Mw/Mn measured by GPC was 1.7. Also, the composition of the polymer measured by $^{19}$F-NMR was VdF/TFE/HFP=50.6/20.1/29.4 (% by mol).

EXAMPLE 13

The fluorine-containing polymer was prepared in the same manner as in Example 11, except that 11 g of diethyl malonate and 0.45 g of APS were used.

The ratio of the gaseous phase monomers was VdF/TFE/HFP=5.6/4.9/89.6 before polymerization and 6.2/4.4/89.4 after polymerization.

(a) The critical temperature and critical pressure of the composition VdF/TFE/HFP=5.6/4.9/89.6 (% by mol) in the polymerization vessel was calculated by the Peng-Robinson formula using Aspen Plus Ver. 11.1 and $T_c$=88° C. and $P_c$=3.0 MPa. Furthermore, conversion was conducted by reduced temperature ($T_R$) 0.95 and reduced pressure ($P_R$) 0.80 and T=70° C. and P=2.4 MPa. The polymerization conditions of the present Example are the reduced temperature or higher and the reduced pressure or higher.

(b) To maintain the total concentration of monomers in the gaseous phase at 5 mol/liter, a monomer mixture of VdF/TFE/HFP (67.5/24/8.5% by mol) was supplied successively and the pressure of the gaseous phase was maintained at 3.5 MPa (absolute pressure).

(c) The stirring rate is maintained at 570 rpm.

361 g of the fluorine-containing polymer was obtained. The weight average molecular weight Mw measured by GPC was 67,000, the number average molecular weight Mn measured by GPC was 40,000 and Mw/Mn measured by GPC was 1.7. Also, the composition of the polymer measured by $^{19}$F-NMR was VdF/TFE/HFP=50.6/21.8/27.6 (% by mol),

COMPARATIVE EXAMPLE 5

The fluorine-containing elastomer was prepared in the same manner as in Example 11, except that the composition inside the vessel was VdF/TFE/HFP=9.7/5.1/85.2% by mol, the pressure inside the vessel was 6.3 MPa, 3.0 g of diethyl malonate and 0.3 g of APS were used and the composition ratio of the successively supplied monomer was VdF/TFE/HFP=50.0/20.0/30.0 (% by mol), The composition after polymerization was VdF/TFE/HFP=3.6/3.4/93.0 (% by mol)

260 g of the fluorine-containing elastomer was obtained. The weight average molecular weight Mw measured by GPC was 120,000, the number average molecular weight Mn measured by GPC was 55,000 and Mw/Mn measured by GPC was 2.3. Also, the composition of the polymer measured by $^{19}$F-NMR was VdF/TFE/HFP=49.1/18.9/32.0 (% by mol).

EXAMPLE 14 AND COMPARATIVE EXAMPLE 6

Vulcanized fluororubber was obtained according to the following standard composition 2 and vulcanization conditions using the fluorine-containing polymers obtained in Example 11 and Comparative Example 5.

(Standard Composition 2)

| | |
|---|---|
| Fluorine-containing polymer | 100 parts by weight |
| Bisphenol AF | 2.17 parts by weight |
| Benzyltriphenylphosphonium chloride | 0.77 part by weight |
| High-activity magnesium oxide | 3 parts by weight |
| Carbon black MT-C | 20 parts by weight |
| Calcium hydroxide | 6 parts by weight |

(Standard Vulcanization Conditions 2)
Kneading method: Roll kneading
Press vulcanization: 15 minutes at 180° C.
[when the pressing pressure reaches 2 to 3 MPa, pressure is reduced for 1 minute (about 0.01 MPa)]
Oven vulcanization: 24 hours at 230° C.

TABLE 3

| | unit | Com. Ex. 14 | Com. Ex. 6 |
|---|---|---|---|
| Mooney viscosity of polymer (121° C.) | | 56 | 51 |
| MW/MN | | 1.9 | 2.3 |
| 100% modulus | MPa | 3.7 | 3.6 |
| Tensile strength at break | MPa | 13.4 | 11.0 |
| Elongation at break | % | 386.7 | 433.3 |
| Hardness (shore A) peak value | | 78.9 | 81.3 |
| Compression set (200° C. × 72 hr) | % | 19.4 | 41.9 |
| Curastometer model II (170° C.) | | | |
| Minimum viscosity (ML) | Kgf | 0.14 | 0.23 |
| Vulcanization degree (MH) | Kgf | 1.59 | 1.17 |
| Induction time (T10) | min. | 5.25 | 6.80 |
| Optimum vulcanization time (T90) | min. | 12.90 | 15.30 |
| Mooney scorch (T5)(145° C.) | min. | 12.97 | 15.32 |

INDUSTRIAL APPLICABILITY

According to the preparation process of the present invention, a fluorine-containing polymer can be obtained, which has few branched chains and little weight change in high temperatures (little thermal decomposition and evaporation) and in which composition distribution substantially does not occur.

Also, using this preparation process, a fluorine-containing polymer, which gives a vulcanized fluororubber having high vulcanization efficiency, excellent mold processability and low compression set, although the viscosity is low to a conventionally unknown degree, and a composition comprising the same are obtained.

The invention claimed is:

1. A process for preparing a fluorine-containing polymer, which is a batch copolymerization process conducted under conditions of reduced temperature of at least 0.95 and reduced pressure of at least 0.80 of the critical constant calculated from critical temperature, critical pressure and composition ratio of each monomer in the gaseous phase of the reaction vessel using the Peng-Robinson formula;

wherein when the number of monomer components in the target polymer is represented as n (n is an integer of 2 or larger), the name of each monomer component is represented as $A_1, A_2, \ldots A_n$, the weight percentage of each monomer component $A_1, A_2, \ldots A_n$ of the target polymer composition is represented as $a_1, a_2, \ldots a_n$ (%) (a satisfies $$\sum_n a_n = 100 \Bigg),$$

the weight percentage of each monomer component of the initial monomer composition is represented as $a'_1, a'_2, \ldots a'_n$ (%) (a' satisfies $$\sum_n a'_n = 100$$

and $a'_1, a'_2, \ldots a'_n$ is determined in a constant manner depending on predetermined polymerization conditions) and specific gravity of the gaseous phase monomers when polymerizing/specific gravity of the target polymer is represented as B, the composition weight ratio of additional monomers is calculated for each monomer from the formula $$(a_1 - a'_1 \times B):(a_2 - a'_2 \times B) \ldots (a_n - a'_n \times B)$$

in the order of components $A_1, A_2, \ldots A_n$, and additional monomers containing additional monomers in the composition weight ratio of additional monomers are added.

2. The process for preparing a fluorine-containing polymer of claim 1, wherein the polymerization pressure is at least 4 MPa.

3. The process for preparing a fluorine-containing polymer of claim 1, wherein said fluorine-containing polymer is a copolymer comprising vinylidene fluoride and hexafluoropropylene; and the mol ratio of vinylidene fluoride:hexafluoropropylene is 9:1 to 5:5.

4. The process for preparing a fluorine-containing polymer of claim 1, wherein the polymerization pressure is at least 3 MPa.

5. The process for preparing a fluorine-containing polymer of claim 4, wherein said fluorine-containing polymer is a copolymer comprising vinylidene fluoride, hexafluoropropylene and tetrafluoroethylene; and the mol ratio of vinylidene fluoride:hexafluoropropylene is 9:1 to 5:5 and the content of tetrafluoroethylene is at most 40% by mol.

6. A fluorine-containing polymer composition comprising the fluorine-containing polymer obtained by the process of claim 1, a curing agent and a vulcanization accelerator.

7. The fluorine-containing polymer composition of claim 6, wherein said fluorine-containing polymer has Mooney viscosity of at most 15 at 121° C. and substantially does not contain iodine and said composition has compression set after vulcanization of at most 25%.

8. The fluorine-containing polymer composition of claim 6, wherein weight average molecular weight/number average molecular weight measured by GPC is at most 3.0.

* * * * *